March 18, 1947.　　　E. R. SHENK　　　2,417,522
MULTI-VIBRATOR CIRCUIT
Filed March 16, 1944
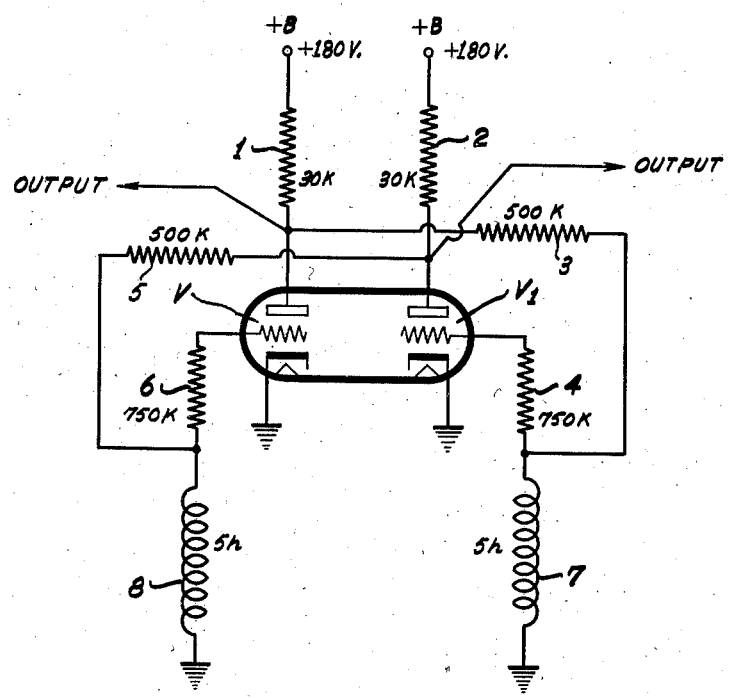
INVENTOR.
EUGENE R. SHENK
BY
　　　　　
ATTORNEY.

Patented Mar. 18, 1947

2,417,522

UNITED STATES PATENT OFFICE 2,417,522

MULTIVIBRATOR CIRCUIT

Eugene R. Shenk, Brooklyn, N. Y., assignor to Radio Corporation of America, a corporation of Delaware Application March 16, 1944, Serial No. 526,805

8 Claims. (Cl. 250—36)

The present invention relates to multi-vibrators.

A multi-vibrator is known in the art as a generator circuit having two degrees of electrical stability and which employs a pair of vacuum tube electrode structures whose grids and anodes are interconnected regeneratively. When there is a maximum flow of current in one electrode structure, there is a minimum or no current flow in the other electrode structure, and vice versa. Such known multi-vibrators rely upon the use of condensers as essential elements in the circuit.

An object of the present invention is to provide a multi-vibrator circuit which eliminates the need for condensers.

Another object of the invention is to provide a multi-vibrator circuit whose time constant circuits are composed solely of resistor and inductor elements.

A further object of the invention is to provide a multi-vibrator circuit which will give a higher frequency of operation than conventional multi-vibrator circuits for the usual values of circuit elements.

The following is a detailed description of the invention in conjunction with a drawing, whose single figure illustrates the preferred embodiment of the invention.

Referring to the drawing, the multi-vibrator is shown as comprising a dual triode vacuum tube having a pair of electrode structures V and VI within a single evacuated envelope. Although these electrode structures are shown as part of a single tube, it should be understood that they may be enclosed within separate evacuated envelopes. The anodes are connected to a source of positive polarizing potential +B through individual resistors 1 and 2. The anode of V is connected to the grid of VI through resistors 3 and 4. The anode of VI is connected to the grid of V through resistors 5 and 6. The junction points of resistors 3 and 4 and of resistors 5 and 6 are respectively connected to ground through inductance coils 7 and 8. The cathodes of V and VI are directly connected to ground.

The multi-vibrator functions to produce an essentially square wave form of output voltage from each anode and the operation of the circuit is as follows: Let us assume that V has just ceased conducting current. The voltage on the anode of V increases as a result of this electrode structure ceasing to pass current and for this reason the voltage on the grid of VI will go more positive and cause a greater flow of current in VI. This greater current flow in VI will result in a lower voltage on the anode of VI, as a consequence of which a voltage of negative polarity will appear across the coil 8 in the grid circuit of V. This negative voltage across coil 8 will increase exponentially toward zero with time, and when the cut-off grid voltage point of V is reached, the electrode structure V will start to conduct current. When V starts to conduct, the voltage on the anode of V drops, as a result of which a negative voltage appears across the coil 7 in the grid circuit of VI. This negative voltage is of sufficient magnitude to bias VI to a point well below cut-off. It will thus be seen that when there is maximum current flow in one electrode structure, there will be no current flow in the other electrode structure, and the current passing conditions automatically interchange at a frequency dependent upon the values of the circuit constants and the characteristics of the tubes.

In the embodiment of the invention shown in the drawing, the period of the multi-vibrator is proportional to L/R, where L is the inductance and R the resistance: If L is increased, the frequency of the multi-vibrator decreases, and if L is decreased, the frequency of the multi-vibrator increases. If R is increased, the frequency will increase, and by the same token if R is decreased, the frequency decreases.

The values for the circuit elements indicated on the drawing have been given by way of example, and were actually employed in one embodiment successfully tried out in practice. With the values illustrated, the frequency of an oscillation was of the order of five kilocycles.

With equal values of correspondingly located impedance elements, as shown in the drawing, the conducting time and the non-conducting time of the two electrode structures will be equal, resulting in a wave form of 50% mark and 50% space. However, if unequal values are employed for the correspondingly located resistor and inductor elements associated with the electrode structures, the resulting wave form will no longer be 50% mark and 50% space, but will be different because one electrode structure will conduct longer than the other.

With a multi-vibrator circuit in accordance with the present invention, it has been found that there is obtained a higher frequency than conventional multi-vibrators using usual values for the circuit elements. It should be understood, however, that the present invention can give lower and higher frequencies by suitably selecting the values of the circuit elements.

The resistors 4 and 6 which are located between the grids of the electrode structure and the inductance coils have been found helpful because they increase the resistance in shunt with the coils 7 and 8 respectively when the coil voltage is positive with respect to ground; that is, when the associated tube structure is passing current.

What is claimed is:

1. A multi-vibrator circuit having two degrees of electrical stability comprising a pair of electrode structures each having an anode, a cathode and a grid, an inductance coil connecting the grid of each structure to its cathode, and a resistor connecting the anode of each electrode structure to the grid of the other structure.

2. A multi-vibrator circuit having two degrees of electrical stability comprising a pair of electrode structures each having an anode, a cathode, and a grid, an inductance coil for each electrode structure connected at one terminal through a resistor to the grid thereof and at its other terminal to the cathode thereof, and a resistor connecting the anode of each electrode structure to the grid terminal end of the inductance coil associated with the other electrode structure.

3. A multi-vibrator circuit having two degrees of electrical stability comprising a pair of vacuum tube electrode structures, each having an anode, a cathode and a grid, separate resistive paths between said anodes and a source of positive polarizing potential, an inductance coil for each electrode structure connected at one terminal through a resistor to the grid thereof and at its other terminal to the cathode thereof, and a resistor connecting the anode of each electrode structure to the grid terminal end of the inductance coil associated with the other electrode structure.

4. A multivibrator circuit having two degrees of electrical stability comprising a pair of electrode structures each having an anode, a cathode and a grid, an inductance coil connecting the grid of each structure to its cathode, and a resistor connecting the anode of each electrode structure to the grid of the other structure, the correspondingly positioned inductance coils and resistors of said multi-vibrator circuit having equal values, whereby said multi-vibrator circuit produces essentially square waves of 50% mark and 50% space.

5. A multi-vibrator circuit having two degrees of electrical stability comprising a pair of vacuum tube electrode structures, each having an anode, a cathode and a grid, separate resistive paths between said anodes and a source of positive polarizing potential, an inductance coil for each electrode structure connected at one terminal through a resistor to the grid thereof and at its other terminal to the cathode thereof, and a resistor connecting the anode of each electrode structure to the grid terminal end of the inductance coil associated with the other electrode structure, the correspondingly positioned inductance coils and resistors of said multi-vibrator circuit having equal values, whereby said multi-vibrator circuit produces essentially square waves of 50% mark and 50% space.

6. A multivibrator circuit having two degrees of electrical stability comprising a pair of electrode structures each having an anode, a cathode and a grid, an inductance coil connecting the grid of each structure to its cathode, and a resistor connecting the anode of each electrode structure to the grid of the other structure, the correspondingly positioned inductance coils and resistors of said multi-vibrator circuit having unequal values, whereby said multi-vibrator circuit produces essentially square waves of unequal mark and space duration.

7. A multi-vibrator circuit comprising a pair of electrode structures each having an anode, a cathode and a grid, an inductance coil connecting the grid of each structure to its cathode, and a connection devoid of concentrated capacity connected between the anode of each electrode structure and the grid of the other structure, said connection including an impedance having a resistive component.

8. An electron discharge device system comprising a pair of electrode structures each having an anode, a cathode and a grid, an inductance coil connecting the grid of each structure to its cathode, a resistor interconnecting the grid of each electrode structure with the anode of the other electrode structure, and means for supplying to said anodes potentials which are positive relative to said cathodes.

EUGENE R. SHENK.

REFERENCES CITED

The following references are of record in the file of this patent:

UNITED STATES PATENTS

| Number | Name | Date |
|---|---|---|
| 2,272,070 | Reeves | Feb. 3, 1942 |
| 1,698,290 | Alexanderson | Jan. 8, 1929 |
| 1,999,378 | Tolson | Apr. 30, 1935 |
| 2,182,555 | Geiger | Dec. 5, 1939 |

FOREIGN PATENTS

| Number | Country | Date |
|---|---|---|
| 415,804 | British | Sept. 6, 1934 |

Disclaimer 2,417,522.—*Eugene R. Shenk*, Brooklyn, N. Y. MULTIVIBRATOR CIRCUIT. Patent dated Mar. 18, 1947. Disclaimer filed Feb. 2, 1949, by the assignee, *Radio Corporation of America*.

Hereby enters this disclaimer to claims 1, 4, 7, and 8 of said patent.

[*Official Gazette March 8, 1949.*]